United States Patent Office 2,742,813
Patented Apr. 24, 1956

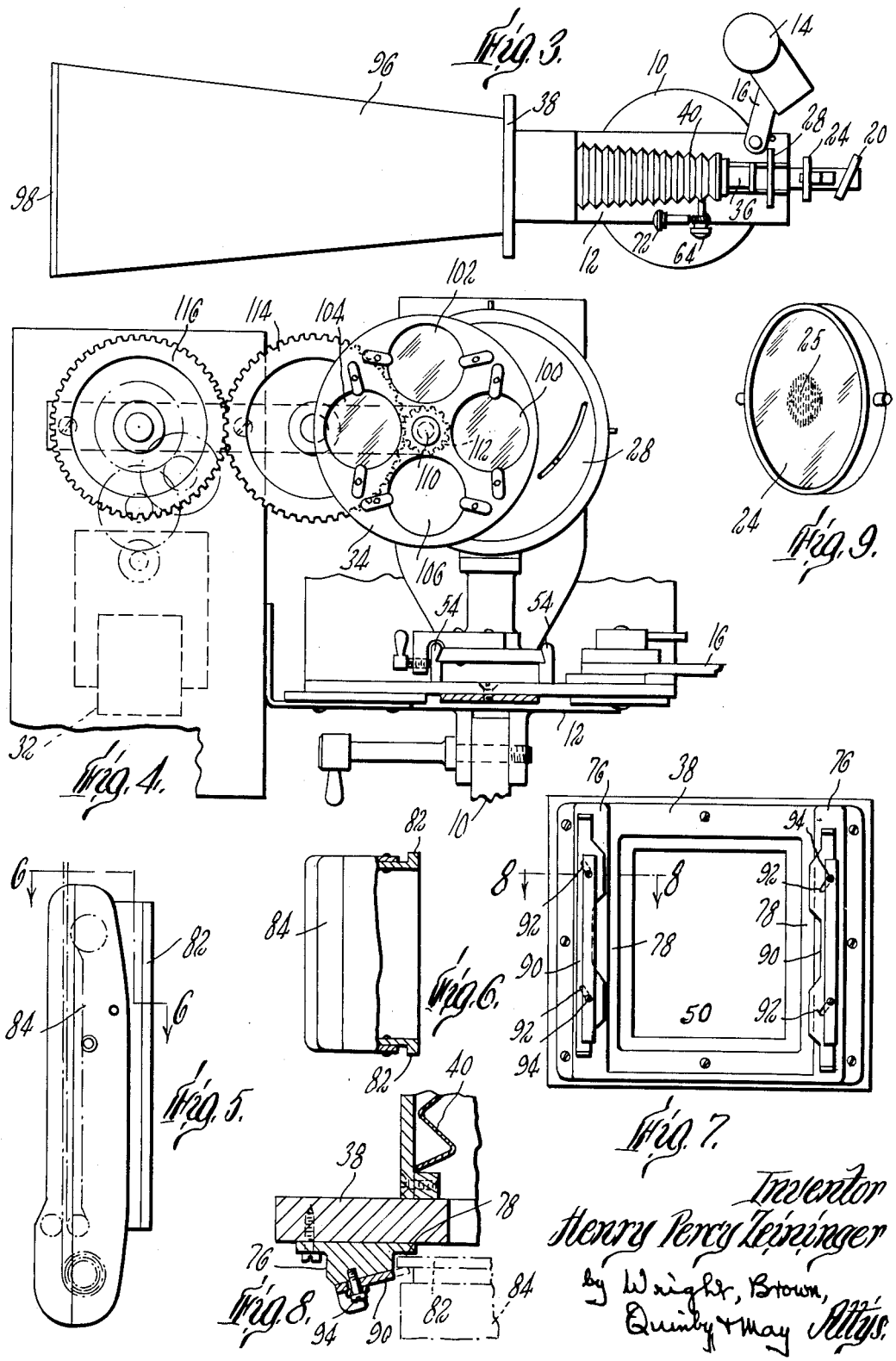

2,742,813

PROJECTION APPARATUS FOR DISPLAYING PRECIOUS STONES

Henry Percy Zeininger, Melrose, Mass.

Application October 17, 1952, Serial No. 315,275

1 Claim. (Cl. 88—24)

This invention relates to apparatus for examining and displaying precious stones such as diamonds so as to reveal not only any flaws which may be present but also to exhibit the refraction colors in such a way that they can be readily observed or photographed.

Apparatus is previously known for mounting a gem in a light beam and casting a magnified image of the gem on a screen, the beam of light being projected through the gem. If the gem is a cut diamond, a considerable portion of the light meeting the sloping facets thereof is reflected away while the portion of the light beam entering through the culet is transmitted with little loss of intensity. The latter forms a relatively bright spot on the screen which tends to fog or obscure the image appearing on the screen. In order to display a more satisfactory image on the screen, I provide means for diffusing the central portion of the beam before it reaches the diamond. I also provide means for illuminating the bezel portion of the diamond which is facing toward the screen. Thus the image on the screen includes both the light rays which are transmitted through the stone and the image produced by rays reflected from the table and the adjacent facets. These images can not only be observed but can be recorded by means of color photographs.

Another object of the invention is to produce an eye-catching, kaleidoscopic image on the screen by interposing successively in the light beam a series of differently colored filters. The resultant effects are striking and can be effectively used in attracting attention to adjacent advertising matter.

For a more complete understanding of the invention reference may be had to the following description thereof and to the drawings, of which—

Figure 3 is a plan view on a smaller scale, of the apparatus shown in Figure 1, but with a different screen;

Figure 4 is a sectional view on the line 4—4 of Figure 1;

Figure 5 is a side elevation of a camera or film holder adapted to be attached to the apparatus shown in Figures 1 and 2, in place of the screen shown therein;

Figure 6 is a plan view of the camera shown in Figure 5, a portion being broken away to show in section on the line 6—6 of Figure 5;

Figure 7 is an elevation of an end frame of the apparatus shown in Figure 1;

Figure 8 is a fragmentary sectional view on the line 8—8 of Figure 7; and

Figure 9 is a perspective view of a condensing lens forming part of the optical system employed.

Figures 1, 2:
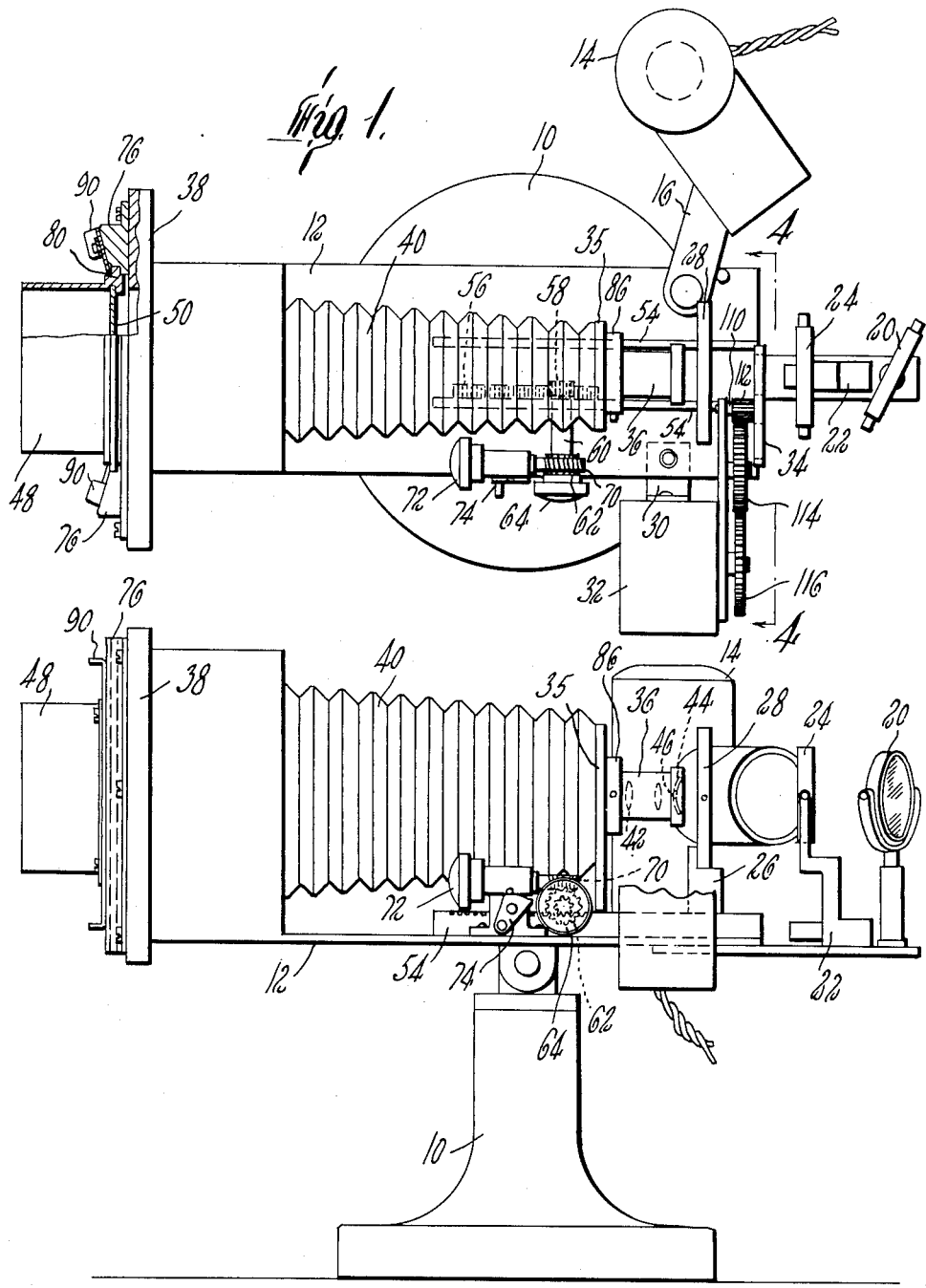
Figure 1 is a plan view of apparatus embodying the invention.
Figure 2 is a side elevation of the same.

The apparatus shown on the drawings comprises a suitable standard 10 hinged to the top of which is a base 12. Mounted on the base are the several optical parts of the apparatus. These parts comprise a lamp, in a lamp housing 14, the latter being supported by an arm 16 which is pivoted on the base 12 so as to be swingable from a position close to the base out to an operating position, as shown in Figure 1, where a beam of light is directed against a mirror 20. The reflected beam is directed above and parallel to the axis of the base 12. Also mounted on the base are a bracket 22 supporting a lens 24 the central portion 25 of which is frosted, a bracket 26 supporting a gem holder 28 (Fig. 4), a bracket 30 on which is mounted a motor 32 driving a disc 34, and a camera which includes a front frame 35 carrying a lens holder 36, a rear frame 38 and a bellows 40 extending between the front and rear frames. In the lens holder 36 are a suitable objective lens 42 and also a concave mirror 44 having a hole 46 in the center thereof. The mirror 44 is mounted between the gem holder 28 and the lens 42 the hole 46 being aligned with the axis of the light beam directed against the center of the gem holder by the mirror 20 and the condensing lens 24.

The gem holder is adapted to grip the gem such as a diamond by finger elements (not shown) which move radially inward to engage the girdle of the diamond, the diamond being mounted in the holder so that the culet is toward the condensing lens 24, the diamond being arranged with its axis in line with the axis of the light beam. The beam of light therefore impinges directly on the culet and on the pavilion facets of the diamond but the frosted center 25 of the condensing lens diffuses the center of the beam and thus prevents glare on the center of the screen. Part of the marginal portion of the light beam is reflected by the concave mirror 44 against the table and bezel of the diamond so that the top faces of the diamond are illuminated from without as well as by light within. The frame 38 of the apparatus supports a detachable holder 48 having a frosted glass plate or screen 50 on which an image of the diamond is cast when the light beam is directed thereon. This image is the result of light which comes through the diamond as well as the light which is reflected from the table thereof. Since the rays of light which pass through the diamond are internally reflected and also refracted as they leave the bezel facets, reflection colors appear on the screen 50 so that the brilliance or "fire" of the diamond is readily apparent since the image of the diamond is greatly magnified by the lens 42. In order to obtain a sharply focused image on the screen 50 the front frame 35 is mounted on rails 54 so that it can be moved toward or from the rear frame 38. For this purpose suitable mechanism can be employed such as is illustrated in Figures 1 and 2. As shown, a rack 56 is mounted parallel to the rails 54, a pinion 58 being in mesh with the rack 56. The pinion 58 is mounted on a shaft 60 which also carries a worm gear 62 and a finger piece 64. Rapid motion of the frame 35 may be had by turning the finger piece 64. For slow motion of the frame 35 a worm 70 may be moved into mesh with the worm gear 62, the worm 70 being rotatable by manipulation of a finger piece 72. A cam element 74 is provided to rock the worm 70 out of engagement with the worm gear 62 when desired.

The frosted glass screen 50 provides for visual inspection of the gem but if a record of the characteristics of the gem is desired the screen may be replaced by a sensitive film so that a photograph of the enlarged image of the gem may be taken either in black and white or in color. For this purpose frame 38 is provided with vertical rails 76 having grooves 78 to receive the side edges 80 of the screen holder 48 or the side edges 82 of a film holder 84 which can be mounted on the frame 38 so that the film carried thereby can be exposed to the light entering through the lens 42. For photographic purposes a camera shutter 86 is mounted between the front frame 35 and the lens holder 36. In order to hold the screen holder 48 or film holder 84 in position against the frame 38 suitable locking members 90 are slidably mounted on the frame 38 and are guided diagonally by means of suitably inclined slots 92 therein, each slot having a pin 94 extending therethrough to guide the slides 90. As indicated in Figure 7, when the locking members 90 are pulled upward they move outward so as to admit the side rails 80 or 82 of the screen or camera. If the locking members are then pushed down they move inward to hold the screen holder or film holder against the face of the frame 38.

If a still larger image of the diamond is desired, an extension camera box 96 may be mounted on the frame 38 as indicated in Figure 3, this camera box 96 having a projection screen 98 which is considerably larger in area than the screen 50.

The natural brilliance and refraction colors of a diamond may be accentuated for advertising purposes by the use of a device by which a number of color filters are moved in succession into and out of line with the beam of light projected toward the diamond. This portion of the apparatus consists of a disc 34 (Figure 4) which has a circular series of circular holes in which are mounted light filter discs 100, 102, 104, of various colors. One of the holes 106 may be left open. The disc 34 is mounted on a shaft 110 which carries a pinion 112 connected to the motor 32 by any convenient driving means, such as a train of gears 114 and 116. Within the motor casing is a train of reduction gearing (not shown) so that when the motor is connected for operation the disc 34 rotates slowly. The disc is arranged so that the holes therein move successively into and out of the line of the axis of the light beam the discs being closely spaced so that each enters the light beam before the preceding disc has moved completely out of the beam. Thus a light beam of changing colors impinges on the gem. These colors appear in the image of the diamond on the screen 50 and produce a kaleidoscopic affect. This constant movement with the resultant flashing effect on the screen results in an eye-catching display on the screen which is valuable for advertising purposes.

I claim:

Apparatus for examining a transparent gem, comprising a base, means including a light source carried by said base for projecting a beam of convergent rays of light, said means including a condensing lens having a frosted central area, a gem holder on said base adjustable to hold a gem in said light beam, a screen supported by said base in a plane perpendicular to the axis of said light beam, an objective lens mounted between said screen and said gem holder and movable to focus an image of an object held by said holder on said screen, and a concave mirror mounted between said holder and said lens and facing said holder, said mirror having a central aperture.

References Cited in the file of this patent
UNITED STATES PATENTS

| | | |
|---|---|---|
| 1,532,496 | Johnson | Apr. 7, 1925 |
| 1,687,946 | Massiot | Oct. 16, 1928 |
| 1,700,496 | Heitzler | Jan. 29, 1929 |
| 1,700,497 | Heitzler | Jan. 29, 1929 |
| 1,744,485 | Michel et al. | Jan. 21, 1930 |
| 2,098,311 | Schattschneider | Nov. 9, 1937 |
| 2,288,143 | Sheppard | June 30, 1942 |